Dec. 30, 1958 F. W. GEBHARD 2,866,907
DUAL BATTERY SWITCH SYSTEM
Filed Jan. 2, 1957 3 Sheets-Sheet 1

Frederick William Gebhard
INVENTOR.

Dec. 30, 1958  F. W. GEBHARD  2,866,907
DUAL BATTERY SWITCH SYSTEM
Filed Jan. 2, 1957  3 Sheets-Sheet 2

Frederick William Gebhard
INVENTOR.

BY

Dec. 30, 1958     F. W. GEBHARD     2,866,907
DUAL BATTERY SWITCH SYSTEM
Filed Jan. 2, 1957                                          3 Sheets—Sheet 3
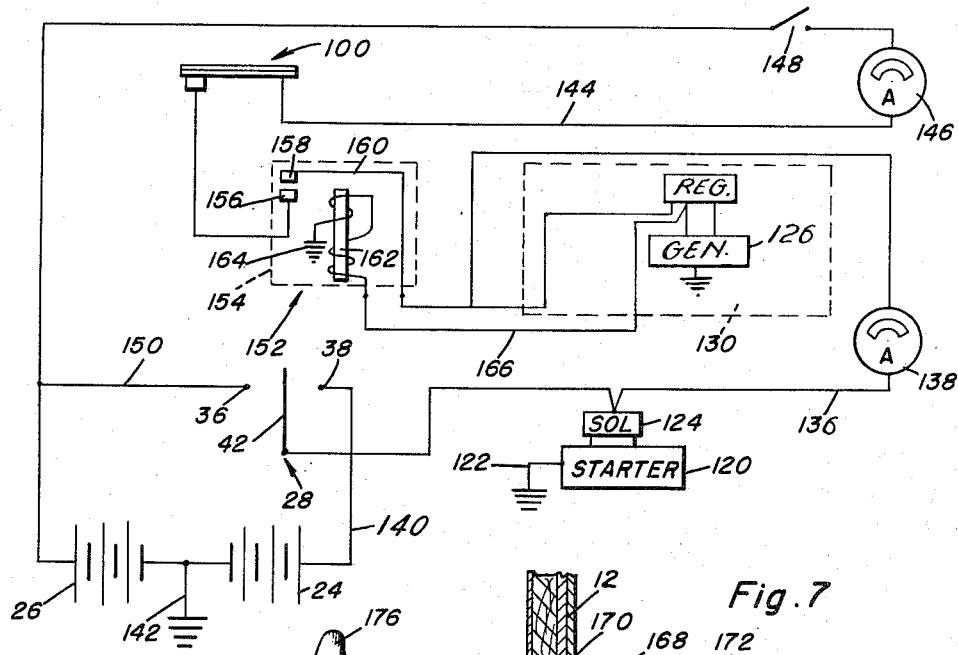
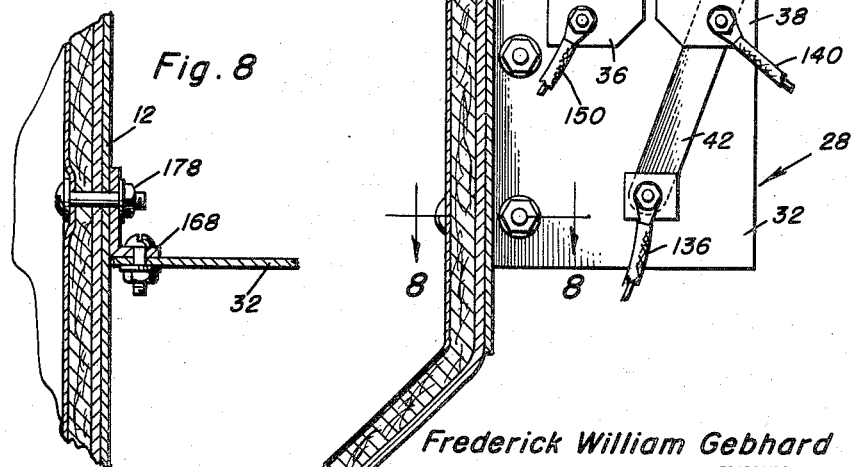
Frederick William Gebhard
INVENTOR.
BY *Clarence A. O'Brien*
*and Harvey B. Jacobson*
Attorneys

United States Patent Office 2,866,907
Patented Dec. 30, 1958

2,866,907

DUAL BATTERY SWITCH SYSTEM

Frederick William Gebhard, West Easton, Pa.

Application January 2, 1957, Serial No. 632,242

11 Claims. (Cl. 290—36)

This invention relates in general to new and useful improvements in electrical systems for internal combustion engines, and more specifically to an improved electrical system which includes a main battery and a reserve battery.

There are many instances where either because of accident or negligence an operator of an automobile returns to his vehicle and finds the battery dead when he attempts to start such vehicle. A common example to cause such a situation is in the wintertime when the operator of the vehicle may be required to use the headlights when first starting out from home and it is daylight when the vehicle is placed upon a parking lot. However, during the interim the operator has forgotten to turn off the headlights. As a result, after working all day the headlights have drained the battery to the extent that it will no longer operate the starter of the engine of the vehicle.

It is therefore the primary object of this invention to provide an improved electrical system for vehicles, which electrical system includes a main battery which is normally used in the operation of the vehicle and a reserve battery which, while not a constant part of the electrical system, remains readily available and fully charged at all times.

Another object of this invention is to provide an improved electrical system for vehicles, the electrical system including a main battery and a reserve battery, the main battery being that battery which is normally used in the operation of the vehicle, and the reserve battery being primarily a spare, the electrical system including means for periodically charging the reserve battery in addition to charging the main battery whereby complete charging of the reserve battery at all times is assured.

Still another object of this invention is to provide an electrical circuit for a vehicle electrical system, the electrical circuit including a main battery and a reserve battery, the main battery functioning in a normal manner with the reserve battery being used primarily as a spare, the electrical circuit being of such a nature that when the vehicle is first started the reserve battery together with the main battery is connected to the generaor for charging, there being provided a suitable switch which will cut out the reserve battery after a predetermined period so that the charging of the reserve battery is restricted.

A further object of this invention is to provide a cut-out switch for an electrical circuit of an electrical system, the cut-out switch being of the thermostatic type and being constructed for mounting upon the exhaust manifold of an internal combustion engine whereby upon the reaching of a predetermined temperature the cut-out switch will open and thus remove a battery temporarily from the electrical circuit of the internal combustion engine.

A still further object of this invention is to provide a switch for selectively placing one of two batteries in an electrical system of an internal combustion engine, the switch including a pair of contacts, which contacts are closely spaced whereby a switch blade of the switch will bridge the contacts as it is moved from one contact to the other to assure no interruption in the electrical circuit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6 is a wiring diagram of a modified form of electrical system, the type of cut-in switch being changed;

Figure 7 is an enlarged fragmentary sectional view taken through the firewall of a vehicle and shows the modified mounting of the battery changing switch; and Figure 8 is an enlarged sectional view taken substantially upon the plane indicated by the section line 8—8 of Figure 7 and shows the specific details of the mounting of the switch.

Figure 1:
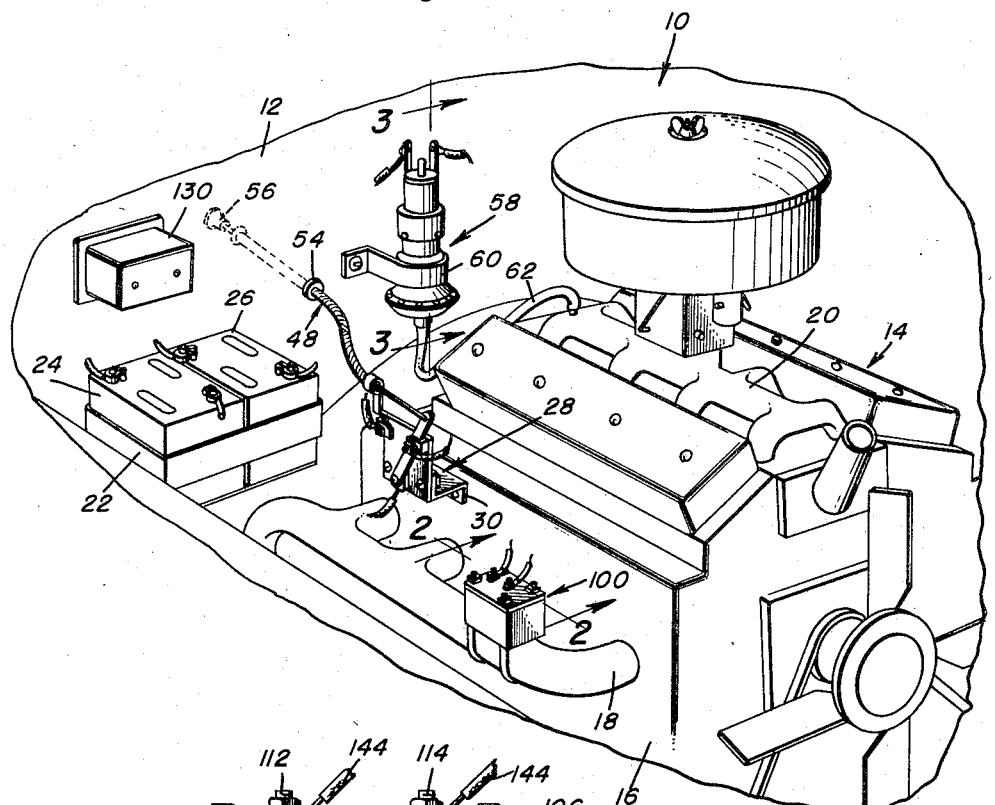
Figure 1 is a fragmentary perspective view of an engine compartment of an internal combustion engine and shows the mounting of both the cut-off switch of the electrical system on the exhaust manifold and the connection of a cut-in switch which is connected to the intake manifold of the internal combustion engine.

Referring now to the drawings in detail, it will be seen that there is illustrated in Figure 1 a portion of the engine compartment of a vehicle which is referred to in general by the reference numeral 10. The engine compartment 10 includes a firewall 12 which has mounted forwardly thereof an internal combustion engine 14. The internal combustion engine 14, among other parts, includes a block 16 which has attached thereto an exhaust manifold 18 and an intake manifold 20. Also mounted in the engine compartment is a battery box 22 carrying batteries 24 and 26, the battery 24 being considered a main battery and the battery 26 being considered a reserve battery.

Figure 4:
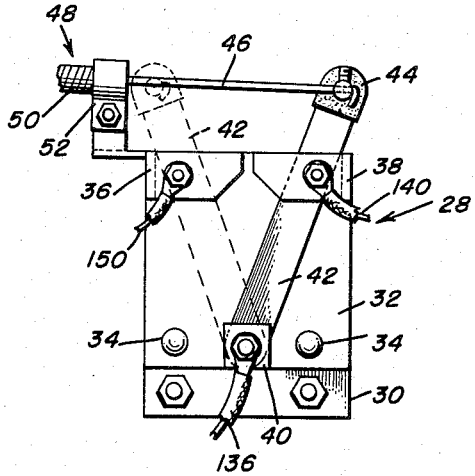
Figure 4 is an enlarged fragmentary elevational view of the switch for changing from one battery to the other, an alternative position of the switch being shown in dotted lines.

In order to permit the proper functioning of the internal combustion engine 14 and other parts of the vehicle 10, the internal combustion engine 14 is provided with a starter which is normally operated by a solenoid, a generator and a voltage regulator. These are normally so connected that when desired the starter can draw current from a battery to effect the starting of the internal combustion engine 14 and when the internal combustion engine 14 is operated, the generator will supply electrical energy, said supply being controlled by the regulator being used by the vehicle 10 in its operation with the excess being delivered to the battery of the vehicle. However, when a second battery is placed in the vehicle it is necessary that there be provided some sort of means to make the second battery completely separate from the remainder of the electrical system except when needed and when being charged. In order to accomplish this, it is necessary that there be provided a selector switch for selecting the battery used. Such a selector switch is illustrated in Figures 1 and 4 and is referred to in general by the reference numeral 28. The battery selector switch 28 is secured to a side of the engine block 16 by means of a suitable mounting bracket 30 and includes an insulated plate 32 which is secured to the mounting bracket 30 by means of fasteners 34. The upper corners of the insulated plate 32 has secured thereto spaced contacts 36 and 38. Secured to a lower central portion of the plate 32 is a fitting 40 which carries a switch blade 42 for movement between the contacts 36 and 38. The contacts 36 and 38 are narrowly spaced and the switch blade 42 is of a width to bridge the contacts 36 when in a central position so that the electrical system is not interrupted during the shifting from one battery to the other.

In order that the battery selector switch 28 may be remotely operated from within the body of the vehicle, the upper end of the switch blade 42 is provided with insulated fitting 44 to which there is connected a wire 46 of a Bowden wire assembly 48. The Bowden wire assembly 48 includes a flexible housing 50 which has the forward end thereof anchored by a fitting 52 carried by the plate 32. The Bowden wire 48, as is best illustrated in Figure 1, passes through the firewall 12 and is sealed relative thereto by means of a grommet 54. The rear end of the Bowden wire 48 is provided with a suitable knob 56 to effect movement of the wire 46 through the housing 50 and the shifting of the switch plate 42 as desired.

In order to effect the charging of the spare battery which in this instance is the reserve battery 26, it is necessary that the battery 26 be cut in the electrical system of the vehicle 10 at certain times for charging. So that this may be automatic, there is provided an engine responsive cut-in switch which is referred to in general by the reference numeral 58. The switch 58, as is best illustrated in Figure 1, is secured to the firewall 12 by means of a mounting bracket 60 and is connected to the intake manifold 20 by means of a vacuum line 62.

Figure 3:
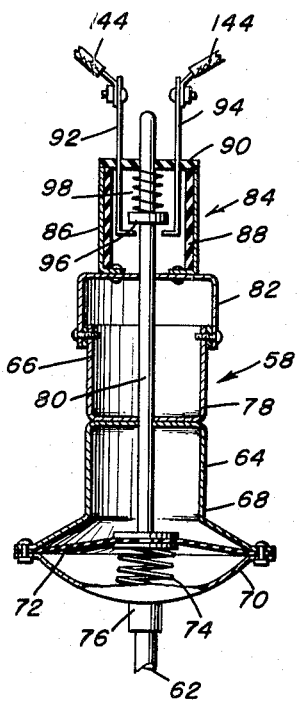
Figure 3 is an enlarged fragmentary sectional view taken substantially upon the plane indicated by the section line 3—3 of Figure 1 and shows the details of a vacuum cut-in switch.

Referring now to Figure 3 in particular, it will be seen that the cut-in switch 58 includes a lower housing 64 and an upper housing 66. The lower housing 64 includes an upper part 68 and the lower part 70. Disposed between the parts 68 and 70 is a diaphragm 72 which is urged upwardly by means of a spring 74 disclosed in the lower part 70. Connected to the lower part 70 is a fitting 76 which in turn has connected thereto the vacuum line 62.

The upper housing 66 includes a lower part 78 which is connected to the upper part 64 of the lower housing 66 with the connecting portions of the two forming a guide for an elongated rod 80 connected to the diaphragm 72 and extending upwardly through the housing 64 and 66. The upper housing 66 also includes an upper half in the form of a removable cover 82 through which the rod 80 extends.

Secured to the cover 82 is a switch mechanism which is referred to in general by the reference numeral 84. The switch mechanism 84 includes a housing 86 which is secured to the cover 82 and which has disposed therein an insulating sleeve 88. Also there is provided an insulating cover 90. Secured to the insulating cover 90 and depending into the insulating sleeve 88 is a pair of combined terminals and contacts 92 and 94.

In order to electrically connect together the contacts 92 and 94, there is carried by the rod 80 a contact bridging member 96. The rod 80 extends upwardly through the cover 90 and is urged downwardly by a light spring 98 disposed between the contact bridging member 96 and the underside of the cover 90. It is to be understood that either the rod 80 is to be formed of an insulating material or the contact bridging member 96 is to be insulated therefrom in order to prevent any short circuiting of the electrical system to the cut-in switch 84.

Figure 2:
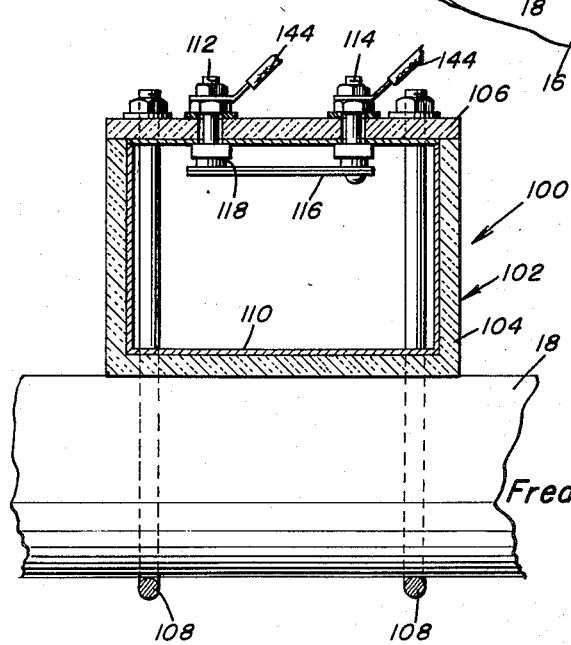
Figure 2 is an enlarged fragmentary longitudinal sectional view taken substantially upon the plane indicated by the section line 2—2 of Figure 1 and shows the specific construction of the thermostatic cut-off switch.

Referring now to Figures 1 and 2 in particular, it will be seen that there is mounted on the exhaust manifold 18 a cut-out switch which is referred to in general by the reference numeral 100. The cut-out switch 100 includes a housing which is referred to in general by the reference numeral 102. The housing 102 is formed of a body portion 104 and a removable cover 106. The body portion 104 is seated on the exhaust manifold 18 and secured thereto by suitable clamps 108, the clamps 108 passing through the cover 106 and retaining the cover 106 on the body portion 104. It is preferred that the housing 102 be formed of a suitable heat insulating material so that the heat transfer from the exhaust manifold 18 to the interior of the housing 102 will not be too rapid. In the event there is insufficient room to mount the switch 100 on the exhaust manifold, then the switch 100 may be mounted on the exhaust pipe rearwardly of the engine.

The housing 102 also includes a metal lining 110 which is both for the purpose of reinforcing the housing 110 and retaining the heat therein.

Carried by the cover 106 is a pair of spaced terminals 112 and 114 which are mounted in insulating relation with respect to the liner 110. The terminal 114 has secured to the lower end thereof a bi-metallic movable contact 116 which is engageable with a fixed contact 118 carried by the terminal 112. It is to be understood that the bi-metallic contact 116 normally engages the terminal 118 to complete an electrical circuit to the cut-out switch 100 and that once the bi-metallic contact 116 is heated, due to its particular make-up, it will move away from the fixed contact 118 to open the electrical circuit through the cut-out switch 100.

Figure 5:
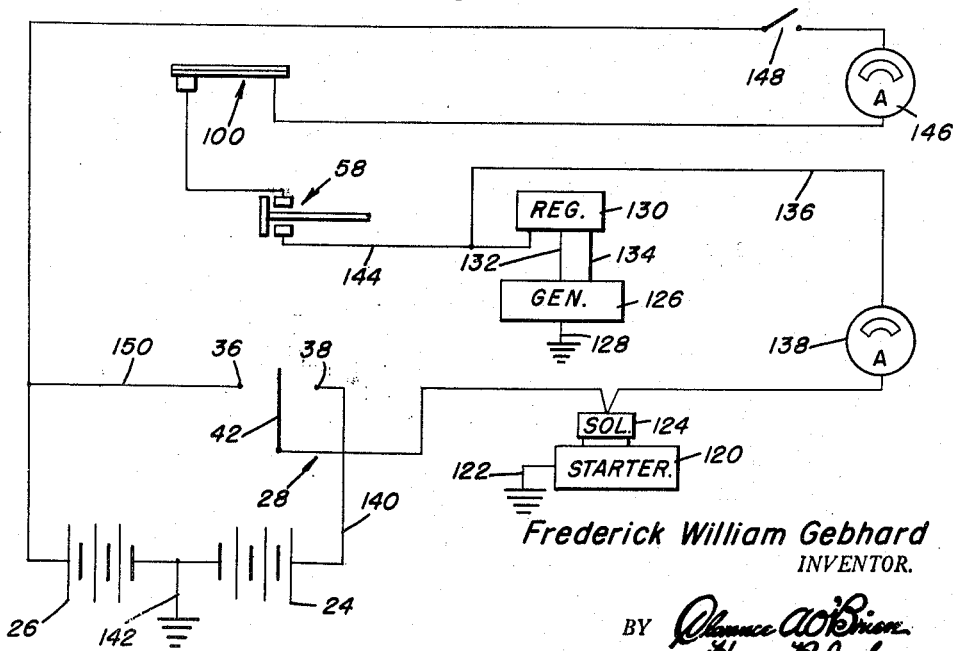
Figure 5 is a wiring diagram of the electrical system of the internal combustion engine.

Referring now to Figure 5 in particular, it will be seen that there is illustrated a wiring diagram of the electrical system of the vehicle 10. It is to be understood that only those portions of the electrical system which involve the generator and the starter of the electrical system are illustrated inasmuch as the ignition and lighting components of the electrical system are conventional and the showing thereof would only confuse the disclosure of the invention.

The electrical system for the vehicle 10 includes a starter 120 for the internal combustion engine 14, the starter being grounded by a ground wire 122 and having connected thereto a starting solenoid 124. Inasmuch as the starting solenoid 124 and the starter 120 are conventional, further description of the two is believed to be unnecessary.

The electrical system also includes a generator 126 which is driven by the internal combustion engine 14. The generator 126 is grounded by means of a ground wire 128 and is connected to a voltage regulator 130 by means of a main battery wire 132. In most instances the voltage regulator 130 will also control the excitation of the field in the generator and accordingly a field wire 134 will extend between the voltage regulator 130 and the generator 126.

Extending from the voltage regulator 130 and connected to the main battery wire 132 thereby is a wire 136. The wire 136 has incorporated therein an ammeter 138 for indicating the charging of the main battery 24. An intermediate portion of the wire 136 is also connected to the solenoid 124 of the starter 120 for energizing the starter 120 when desired. The end of the wire 136 remote from the voltage regulator 130 is connected to the switch blade 42. One terminal of the main battery 24 is connected to the contact 38 by means of a main battery wire 140. The main battery 24 has its other terminal grounded by means of a ground wire 142 which also grounds the reserve battery 26, like terminals of the batteries 24 and 26 being grounded.

When the switch blade 42 is engaged with the contact 38, the electrical system will operate in a normal manner with the main battery 24 furnishing all of the necessary electrical energy for the initial starting of the vehicle 10 and the operation thereof when the generator 126 is not supplying electrical energy. At the same time, when the generator 126 is supplying an excess of electrical energy, it will be transmitted to the battery 24 for storage.

Connected to the voltage regulator 130 is a reserve battery wire 144 whose opposite end is connected to the reserve battery 26. Incorporated in the reserve battery wire is the cut-in switch 58, the cut-out switch 100 and an ammeter 146 for indicating the charging of the reserve battery 26. Also, if it is so desired, there may be incorporated in the reserve battery wire 144 a manually actuated switch 148 for the purpose of interrupting the reserve battery wire 144 in the event the reserve battery 26 should not be in the electrical system at any time. The reserve battery wire 144 is connected to the contact 36 of the battery selector switch 28 by means of a wire 150.

The switch 100 is a normally closed switch whereas the switch 58 is a normally open switch. When the engine 14 is started, the vacuum in the intake manifold 20 causes a vacuum in the lower part 70 of the lower housing 64 and the downward movement of the diaphragm 72. This effects downward movement of the rod 80 and the bridging of the contacts 92 and 94 by the contact bridging member 96 thus moving the cut-in switch 58 to a closed position. This results in the connection of the reserve battery 26 to the generator 126 for receiving a charge therefrom. After the internal combustion engine 14 has run a period of time sufficiently to retain a full charge of the reserve battery 26, the bi-metallic contact 116 will be sufficiently heated to move out of engagement with the fixed contact 118 and open the circuit through the reserve battery wire 144. Thus all of the remaining excess charge from the generator 126 will be distributed to the battery 24 depending upon is requirements.

In the event the battery should become dead and not able to operate the starter 120 at any time, the switch blade 42 will be swung from its position in engagement with the contact 38 to its position in engagement with the contact 36. The reserve battery 26 will then be coupled to the starter 120 through the reserve battery wire 144 and the wire 150. Also, in the event it is desired to supply a longer charge to the reserve battery 26, once the vehicle 10 is operating, the switch blade 42 may be shifted from its position in engagement with the contact 38 into engagement with the contact 36 thus supplying the charge from the generator 126 to the reserve battery 26.

Referring now to Figure 6 in particular, it will be seen that there is illustrated a wiring diagram for a modified form of electrical system. The electrical system differs from the electrical system of Figure 5 only in that the cut-in switch 58 has been replaced by a cut-in switch 152. The cut-in switch 152 includes a housing 154 in which there is mounted a fixed contact 156 and a movable contact 158. The movable contact 158 is mounted on a spring arm 160 and is disposed out of engagement with the fixed contact 156.

In order to effect movement of the movable contact 158 into engagement with the fixed contact 156 upon operation of the internal combustion engine 14, there is provided an electromagnetic device 162 to pull the spring support 160 down. The electromagnetic device 162 is connected to the voltage regulator 130 for energization by the generator 126 and is grounded as at 164. A wire 166 extends between the voltage regulator 130 and the electromagnetic device 162.

It will be seen that the cut-in switch 152, which is mounted in the reserve battery wire 144 will operate in exactly the same manner as the cut-in switch 58. The only difference between the cut-in switch 58 and the cut-in switch 152 is that the cut-in switch 58 is actuated in response to the production of a vacuum in the intake manifold of the engine 14 whereas the cut-in switch 152 is actuated in response to the production of electrical energy by the generator 126.

Referring now to Figures 7 and 8, in particular, it will be seen that there is illustrated a modified form of mounting for the battery selector switch 28. The insulated plate 32 is mounted on a vertically extending mounting bracket 168 which is secured to the forward face of the firewall 12. The firewall 12 is provided with a bushing 170 in which there is mounted for sliding movement a control rod 172.

The forward end of the control rod 172 is pivotally connected to the upper end of a switch blade 42 by means of an insulating fitting 174. The rear end of the control 174 is provided with a suitable handle 176 to effect the longitudinal shifting thereof. It is to be understood that the handle 176 is to be so positioned whereby it may be easily grasped by the operator of a vehicle 10. As is best illustrated in Figure 8, the mounting bracket 168 is secured to the firewall 12 by conventional fasteners 178. Accordingly, the battery selector switch 28 may be mounted on the firewall 12 in any position desired.

From the foregoing description of the present invention it will be readily apparent that there has been devised an electrical system for an internal combustion engine of a vehicle which incorporates both a main battery and a reserve battery. The main battery is used for the normal operation of the vehicle and the reserve battery is actually a spare. However, there has been provided a suitable electrical circuit for the reserve battery whereby it may be used to replace the main battery at any time when desired and is retained in a fully charged state by being periodically connected to the generator of the internal combustion engine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electrical system for an internal combustion engine comprising a generator, a main battery and a reserve battery, a battery selector switch, a ground wire and a first battery wire connected to said generator, said battery selector switch including a pair of spaced contacts and a switch blade, a wire connecting said first battery wire to one of said contacts and to said switch blade, a second battery wire electrically connecting said main battery to the other one of said contacts, said third mentioned wire including a third battery wire electrically connecting said reserve battery to said first battery wire, a ground wire electrically grounding said batteries, a normally closed switch in said third battery wire, a normally open switch in said third battery wire, said normally closed and open switches being located in said third battery wire between said generator and said reserve battery.

2. The electrical system of claim 1 wherein said normally open switch is of the engine operated type.

3. The electrical system of claim 1 wherein said normally closed switch is of the delayed action engine operated type.

4. The electrical system of claim 1 wherein said normally open switch is of the engine operated type and said normally closed switch is of the delayed action engine operated type.

5. The electrical system of claim 1 wherein said normally closed switch is of the thermostatic type and is actuated in response to a rise in engine temperature.

6. An electrical system for an internal combustion engine comprising a generator, a main battery and a reserve battery, a battery selector switch, a ground wire and a first battery wire connected to said generator, said battery selector switch including a pair of spaced contacts and a switch blade, a wire connecting said first battery wire to one of said contacts and to said switch blade, a second battery wire electrically connecting said main battery to the other one of said contacts, said third mentioned wire including a third battery wire electrically connecting said reserve battery to said first battery wire, a ground wire electrically grounding said batteries, a normally closed switch in said third battery wire, a normally open switch in said third battery wire, said normally closed and open switches being located in said third battery wire between said generator and said reserve battery, and means for mounting said normally closed switch on an internal combustion engine exhaust manifold.

7. The electrical system of claim 1 wherein said normally closed switch is of the thermostatic type and is actuated in response to a rise in engine temperature, said normally open switch being of the engine operated type.

8. An electrical system for an internal combustion engine comprising a generator, a main battery and a reserve battery, a battery selector switch, a ground wire and a first battery wire connected to said generator, said battery selector switch including a pair of spaced contacts and a switch blade, a wire connecting said first battery wire to one of said contacts and to said switch blade, a second battery wire electrically connecting said main battery to the other one of said contacts, said third mentioned wire including a third battery wire electrically connecting said reserve battery to said first battery wire, a ground wire electrically grounding said batteries, a normally closed switch in said third battery wire, a normally open switch in said third battery wire, said normally closed and open switches being located in said third battery wire between said generator and said reserve battery, and means for mounting said normally closed switch on an internal combustion engine exhaust manifold, said normally open switch being of the engine operated type.

9. The electrical system of claim 1 wherein said normally closed switch is of the delayed action engine operated type and said normally open switch is of the vacuum actuated type, and means for connecting said normally open switch to an internal combustion engine intake manifold.

10. The electrical system of claim 1 wherein said normally closed switch is of the delayed action engine operated type, said normally open switch being of the electrically controlled type and being connected to said first battery wire for operation by said generator.

11. The electrical system of claim 1 wherein said contacts are closely spaced, and said switch blade is of a width to bridge said contacts to prevent temporary interruption of the electrical system when shifting from said main battery to said reserve battery.

References Cited in the file of this patent
UNITED STATES PATENTS

| | | |
|---|---|---|
| 1,287,266 | Eberly | Dec. 10, 1918 |
| 2,278,745 | St. George | Apr. 7, 1942 |
| 2,564,957 | Cermak | Aug. 21, 1951 |
| 2,629,059 | Baumheckel | Feb. 17, 1953 |
| 2,692,953 | Markett | Oct. 26, 1954 |
| 2,729,750 | Draper et al. | Jan. 3, 1956 |